(No Model.) 2 Sheets—Sheet 1.
W. F. SHERMAN.
POWER TRANSMITTING CLUTCH.
No. 413,569. Patented Oct. 22, 1889.
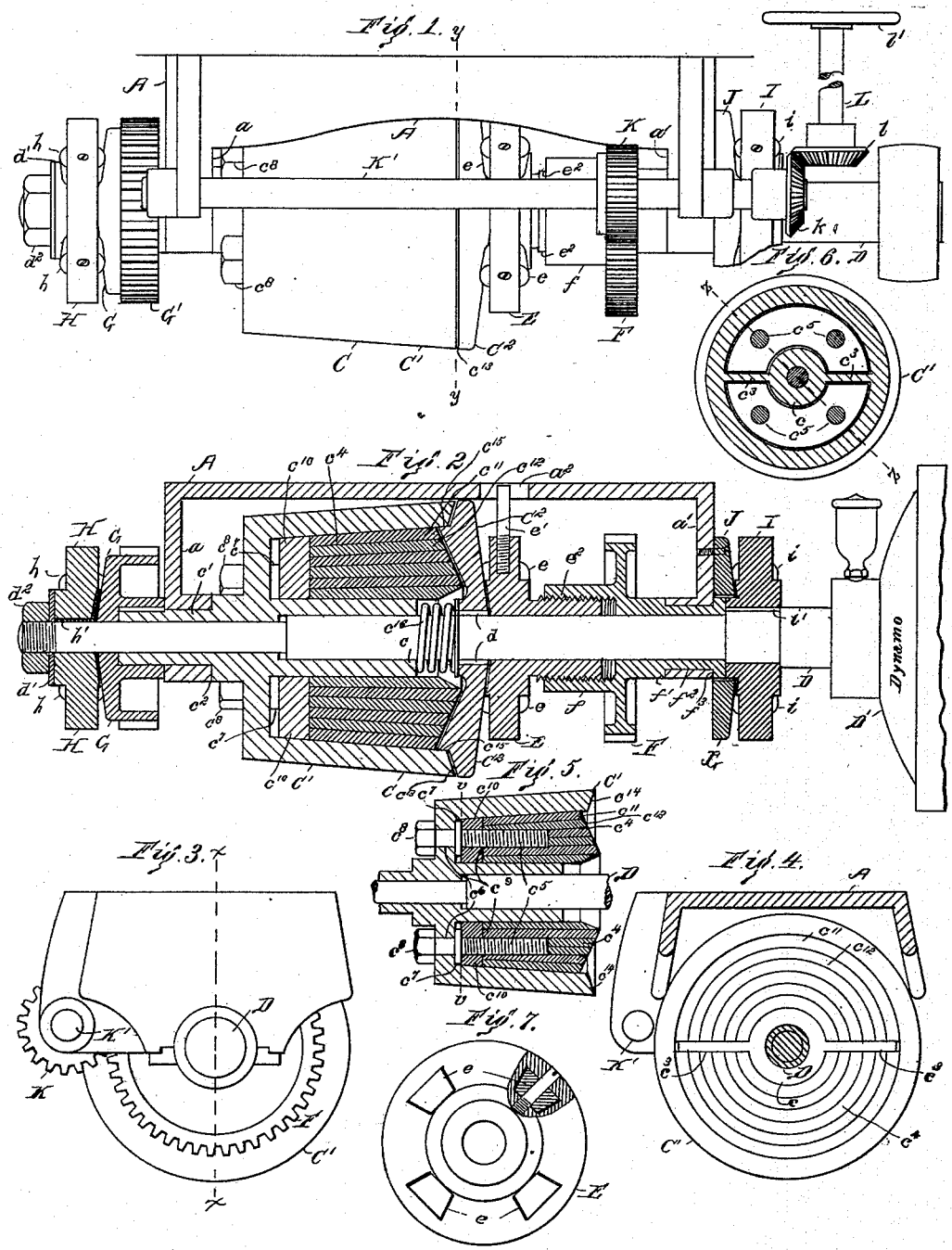

(No Model.) 2 Sheets—Sheet 2.
W. F. SHERMAN.
POWER TRANSMITTING CLUTCH.
No. 413,569. Patented Oct. 22, 1889.
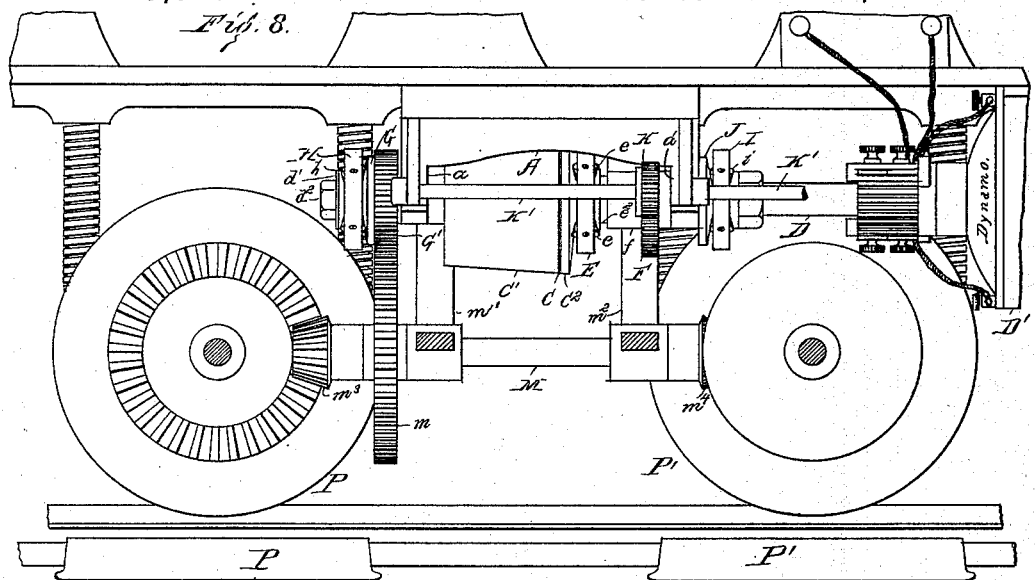
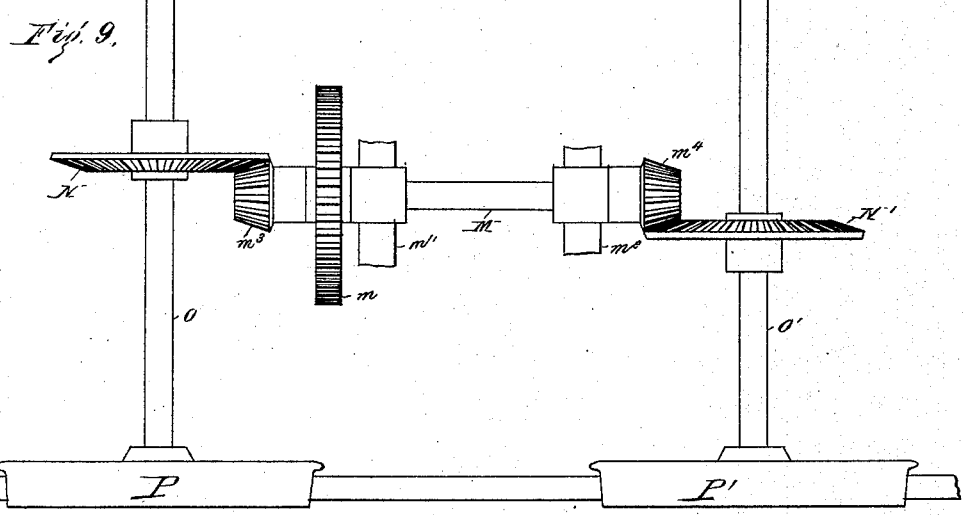
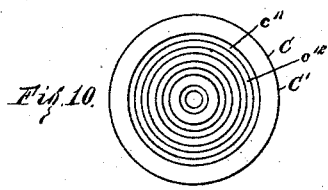
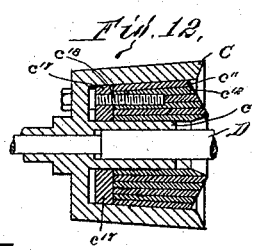
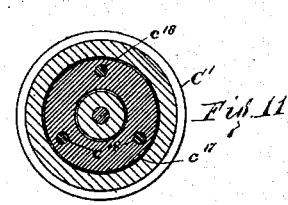
Witnesses
Inventor
William F. Sherman,
By Albert M. Moore,
His Attorney

UNITED STATES PATENT OFFICE.

WILLIAM F. SHERMAN, OF LOWELL, MASSACHUSETTS, ASSIGNOR, BY MESNE ASSIGNMENTS, TO THE SHERMAN ELECTRIC STORAGE EQUIPMENT COMPANY, OF NEW HAMPSHIRE.

POWER-TRANSMITTING CLUTCH.

SPECIFICATION forming part of Letters Patent No. 413,569, dated October 22, 1889.

Application filed July 14, 1887. Serial No. 244,330. (No model.)

*To all whom it may concern:*

Be it known that I, WILLIAM F. SHERMAN, a citizen of the United States, residing at Lowell, in the county of Middlesex and Commonwealth of Massachusetts, have invented a certain new and useful Improvement in Power-Transmitting Clutches, of which the following is a specification.

My invention relates to power-transmitting clutches, and is specially designed to be used with electric motors on cars of electric railways.

In the accompanying drawings, on two sheets, Figure 1 is a side elevation of my improved clutch, showing a brake-rod and means of operating said clutch by the use of said brake-rod and a band-pulley on the arbor of the clutch to enable said arbor to be connected with an electric or other motor; Fig. 2, a section on line $x\ x$ in Fig. 3 of the clutch and connected parts, showing part of a dynamo or electric motor; Fig. 3, a right end elevation of my improved clutch, omitting the non-friction wheel and its cones; Fig. 4, a section on the line $y\ y$ in Fig. 1; Fig. 5, a vertical central longitudinal section of the female part of the clutch on the line $z\ z$ in Fig. 6, showing also part of the clutch arbor or shaft; Fig. 6, a vertical transverse section of the same parts on the line $v\ v$ in Fig. 5; Fig. 7, an outside elevation of either of the non-friction wheels, the same being partly in section through the axis of one of the anti-friction cones, said cone being also in section in the same plane; Fig. 8, a side elevation of a part of the lower portion of a car, showing one truck and its supporting-spring, the clutch, part of the dynamo, and the means of connecting the dynamo through the clutch to a longitudinal shaft carrying beveled gears which engage with other beveled gears on the car-wheel axles; Fig. 9, a plan of the wheels and axles of a truck, beveled gears secured on said axles, the shaft carrying beveled gears and a spur-gear; Fig. 10, an end elevation of the open end of the female part of a modified form of the clutch, showing the packing; Fig. 11, like Fig. 10, with the packing omitted; Fig. 12, a section on the line $w\ w$ in Fig. 11.

One object of my invention is to enable cars to be run successfully with less expenditure of power, and, as this invention is specially intended for use with the cars and motors of electric railways, with much less electric energy, in order thereby to reduce the expense of the "plant" and to enable the armature to be run continuously while the train is at rest, so that the momentum of the armature may be used to overcome the inertia of the car in starting the same and to enable the inertia of the car to be overcome quickly or slowly, as desired, according to the grade of the road and the load, and to enable the car on a steep upgrade to be stopped momentarily until the armature shall acquire sufficient speed and momentum to move the car along again with the electric energy that may be applied. It is well known that it requires several times as much power to start a car on a level road or to start a boat as is required to keep such car or boat moving after the inertia of starting has been overcome.

The clutch hereinafter described is applicable to different kinds of machinery, but is especially designed for cars and vessels driven by electric motors, and in Figs. 8 and 9 of the drawings is shown applied to a car.

In Figs. 1, 2, 3, 4, and 8, A is the frame, preferably metallic, which supports the clutch C, and is provided with two vertical posts or hangers $a\ a'$. The female part $C'$ of the clutch C is provided with a hub $c$, having a reduced part $c'$ and shoulder $c^2$, which reduced part serves as a journal of the clutch and turns in the hanger $a$. The body of the part $C'$ of the clutch is in shape like the frustum of a hollow cone, and may be provided with one or more radial partitions $c^3$, arranged within said part $C'$ and connecting the walls of said part with the hub $c$, the object of said partitions being to prevent the packing $c^4$ from turning in said part $C'$, and also to strengthen said part. Four screws $c^5$ turn without advancing in holes $c^6$ (see Fig. 5) in the closed end of the part $C'$, parallel with the axis of the clutch, said screws being provided with collars $c^7$ within said closed end and on the outside of said closed end with many-sided nuts or rings $c^8$, which are securely fastened to the outer ends of said screws, and which are adapted to be engaged by a wrench, for the purpose of turning said screws. The threaded parts of the screws within the clutch engage threaded holes $c^9$ in arc-shaped plates $c^{10}$ and extend through said plates into the packing $c^4$, so that turning the screws in one direction pushes the packing toward the open end of the part $C'$, and turning them in the other direction draws the packing into said part $C'$ and compresses the packing, which is somewhat elastic, owing to its composition. The packing consists of alternate sheets of leather $c^{11}$ and vulcanized rubber $c^{12}$, the outer sheet being preferably of leather, as well as the innermost sheet, in order that when the packing is heated by excessive friction and the rubber is thereby softened it may not adhere to the metal of the part $C'$ of the clutch. The male part $C^2$ of the clutch C is circular and of the same diameter as the open end of the part $C'$, and is beveled at $c^{13}$ annularly near its outer edge to fit the beveled outer edge $c^{14}$ of said part $C'$. Within the annular bevel $c^{13}$ is an annular flange $c^{15}$, just large enough and of a proper shape to fill the open end of the part $C'$ when the clutch is fully coupled. Within the flange $c^{15}$ the inner face of the part $C^2$ is provided with an annular cavity which flares from near the center outwardly to the projecting edge of the flange $c^{15}$, in order to give a greater surface of contact between the parts of the clutch, or between the inner face of the part $C^2$ and the packing $c^4$. The flange $c^{15}$ is intended to be at all times, whether the clutch is coupled or not, within the bevel of the part $C'$, the packing not extending to said bevel. This is to prevent the packing from fraying at the edges and getting between the beveled edges $c^{13}$ $c^{14}$, and thus interfering with a complete contact between these beveled surfaces. A spiral spring $c^{16}$ between the part $C^2$ and the inner end of the hub $c$ uncouples the clutch, the coupling being accomplished as hereinafter described. The male part of the clutch is splined at $d$ onto the shaft D of the dynamo $D'$, so as to be free to slide thereon and to be turned thereby, the shaft D also passing through and turning freely in the hub $c$ of the female part of the clutch. On the shaft D is a non-friction wheel E, provided with anti-friction rolls or cones $e$, journaled radially therein and resting against the outer surface of the part $C^2$ of the clutch, the shaft turning freely in said non-friction wheel, which is provided with an arm $e'$, which reaches into or through a slot $a^2$ and prevents the non-friction wheel from turning with the shaft, the slot $a^2$ being long enough in the direction of the shaft D to allow the non-friction wheel to be adjusted longitudinally on said shaft. The non-friction wheel E on the opposite side from the anti-friction rolls $e$ is provided with an externally-threaded hub $e^2$, which engages the internally-threaded hub $f$ of the gear-wheel F, in which the shaft D turns freely, said gear F having a shoulder $f'$ and a reduced part $f^2$ or journal, which turns in the hanger $a'$ of the frame A, the shoulder $f'$ preventing the gear F and its hub from moving outward or away from the non-friction wheel E, so that turning the gear F in one direction causes the wheel E to move away from it and to press the part $C^2$ against the part $C'$ and couple the clutch. The gear-hub $f$ has another shoulder $f^3$ outside of the frame, which prevents said hub $f$ and the gear F from moving longitudinally in the frame A, so that turning the gear F in the other direction will relieve the pressure of the non-friction wheel E upon the part $C^2$ and allow the clutch to be uncoupled by the expansion of the spring $c^{16}$. If the end-thrust of the part $C^2$ of the clutch were borne wholly by the frame A, the friction between the shoulder $c^3$ and the frame would be so great as to occasion a great loss of power. There is therefore secured to the outer end of the part $c'$ a circular plate G, the outer surface of which is conical, and to the end of the shaft D is secured a non-friction wheel H, the anti-friction rolls $h$ of which rest against the outer surface of the plate G, said wheel H and its rolls $h$ being substantially like the wheel E and rolls $e$, except that the wheel H is splined to the shaft D at $h'$ and turns with said shaft, being held thereon by the washer $d'$ and a nut $d^2$, which engages the threaded end of said shaft. The non-friction wheel has a tendency to crowd the shaft D endwise, (to the left in Figs. 1, 2, and 8,) and to counteract this tendency another non-friction wheel I is splined to the shaft D at $i'$, and is provided with anti-friction rolls $i$, which bear against the outer surface of the circular plate J, secured to the frame A and being substantially a part of the same.

The construction above described prevents any addition of friction between the revolving parts of the clutch and the frame upon the coupling of the clutch. The packing of the clutch will be found to be particularly well adapted for the purpose of creating a moderate amount of friction and adhesion between the parts of the clutch, both the leather and the rubber having the property of adhering to the metallic face of the part $C^2$ of the clutch, the leather being used partly to support the layers of rubber, and the rubber being used because the friction of the part $C^2$ upon it will cause it to soften and become still more adhesive. It will be noticed that the plate G is also a gear $G'$; or, in other words, the plate G and the gear $G'$ are cast in one piece, and from this gear is transmitted the power from the motor to the machinery it is desired to drive when the clutch is coupled, as will be further explained. The clutch may be coupled and allowed to uncouple simply by turning the wheel F, which might be a hand-wheel or a band-pulley, but is here represented, as above stated, as a gear-wheel. The teeth of the gear-wheel F engage the teeth of a pinion K, supported upon a shaft K', which turns in suitable bearings in the hangers $a\ a'$ of the frame A, said shaft K' being parallel with the shaft D, and one end of said shaft K' being provided with a beveled gear $k$, secured to said shaft, which engages another beveled gear $l$ on the vertical spindle L, the latter being provided at its upper end with a hand-wheel $l'$, (see Fig. 1,) like the brake-wheel in common use, so that by turning the brake-wheel the shaft K' is revolved, and, through the pinion K and gear-wheel F, causes the clutch to be coupled or uncoupled, according to the direction in which the brake-wheel and its spindle are rotated.

When the clutch is used with a car, it is secured to the under side of the body of the car, as represented in Fig. 8, and a shaft M is arranged below the clutch parallel with the shaft D, the shaft M carrying a gear $m$, which engages with the gear G' and causes the shaft M to be rotated when the gear G' is rotated—that is, when the clutch C is coupled. The shaft M is supported horizontally in suitable hangers $m'\ m^2$, the hangers being secured in any obvious manner to the under side of the body of a car, or, if preferred, being cast in one piece with the frame A. Each end of the shaft M has secured to it a beveled pinion $m^3\ m^4$, and these pinions engage beveled gears N N', secured to the axles O O', respectively, of the car or truck, the car-wheels being represented at P P'.

The construction of the female part of the clutch shown in Figs. 10, 11, and 12 differs from that above described in omitting the partitions $c^3$ (shown in Fig. 4) and in using a single annular plate $c^{17}$ and three screws $c^{18}$ in place of the two arc-shaped plates $c^{10}$ and two pairs of screws $c^5$, the single plate and three screws serving the same purpose as the two plates and four screws required when the partitions $c^3$ are used, it being intended to use the partitions only when the clutches are to be subjected to great strain.

The contact between the packing and the male part of the clutch in the partial coupling, which takes place before the beveled surfaces of the counterparts of the clutch touch each other, I call the "relief-contact," because it relieves the dynamo or transmits less power and consumes less power when the car is running on level ground or under favorable conditions, while positive contact or actual contact of the metal parts of the clutch is only necessary when the car is on an upgrade, or in overcoming the inertia of the car when starting.

I claim as my invention—

1. A clutch having a female part provided with a somewhat elastic packing and with an annular beveled open end and a male part provided with an annular flange adapted to enter and fit said open end when said clutch is fully coupled, and provided also with an annular bevel around said flange to fit the beveled end of said female part, said packing being arranged at a distance from the open end of said female part less than the depth of said flange, in order that a partial coupling of said clutch may bring said packing and said male part in contact with each other, as and for the purpose specified.

2. A clutch having a female part provided with a packing of alternate concentric layers of leather and rubber surrounding each other and with an annular beveled open end and a male part provided with an annular flange adapted to enter and fit said open end when said clutch is fully coupled, and provided also with an annular bevel around said flange to fit the beveled end of said female part, said packing being arranged at a distance from the open end of said female part less than the depth of said flange, in order that a partial coupling of said clutch may bring said packing and said male part in contact with each other, as and for the purpose specified.

3. A clutch having a female part provided with radial partitions and with a packing of somewhat elastic material and with an annular beveled open end and a male part provided with an annular flange adapted to enter and fit said open end when said clutch is fully coupled, and provided also with an annular bevel around said flange to fit the beveled end of said female part, said packing being arranged at a distance from the open end of said female part less than the depth of said flange, in order that a partial coupling of said clutch may bring said packing and said male part in contact with each other without turning said packing in said female part, as and for the purpose specified.

4. The combination of a clutch having a female part provided with a closed end and with an annular beveled open end, and having a male part provided with an annular flange adapted to enter and fit said open end when said clutch is fully coupled, and provided also with an annular bevel around said flange to fit the beveled end of said female part, a packing arranged within said female part, plates arranged within said female part, between the closed end thereof and said packing, and adjusting-screws turning in said closed end and forcing said plates against said packing, as and for the purpose specified.

5. The combination of the frame, the clutch having a female part provided with a hub journaled in said frame, another hub journaled in said frame and provided with an internal screw-thread, a shaft turning in said hubs concentrically therewith, said clutch having a male part sliding on said shaft and rotating therewith, a non-friction wheel loose on said shaft and provided with anti-friction rolls which rest against the outer face of said male part, and provided also with an externally-threaded hub adapted to enter and engage said internally-threaded hub, whereby turning said internally-threaded hub in one direction will cause said clutch to be coupled and turning the same in the other direction will allow said clutch to be uncoupled, as and for the purpose specified.

6. The combination of the frame, the clutch having a female part provided with a hub journaled in said frame, another hub journaled in said frame and provided with an internal screw-thread, a shaft turning in said hubs concentrically therewith, said clutch having a male part sliding on said shaft and rotating therewith, a non-friction wheel loose on said shaft and provided with anti-friction rolls which rest against the outer face of said male part, and provided also with an externally-threaded hub adapted to enter and engage said internally-threaded hub, a gear secured to said internally-threaded hub, another shaft provided with a gear which engages said first-named gear, and provided also with a bevel-gear, and a vertical spindle or shaft provided at one end with a hand-wheel and at the other end with a bevel-gear, which engages said first-named bevel-gear, as and for the purpose specified.

7. The combination of the frame, the clutch having a female part provided with a hub journaled in said frame, another hub journaled in said frame and provided with an internal screw-thread, a shaft turning in said hubs concentrically therewith, said clutch having a male part sliding on said shaft and rotating therewith, a non-friction wheel loose on said shaft and provided with anti-friction rolls which rest against the outer face of said male part, and provided also with an externally-threaded hub adapted to enter and engage said internally-threaded hub, another non-friction wheel provided with anti-friction rolls, a circular plate secured to the hub of said female part outside of said frame and bearing against said last-named anti-friction rolls, and a third non-friction wheel secured to said shaft and provided with anti-friction rolls which bear against the outside of said frame at the opposite side of said frame from said circular plate to prevent an endwise movement and pressure of the shaft and to diminish the friction on said shaft, as and for the purpose specified.

8. The combination of the car provided with wheels and axles, bevel-gears secured to said axles, a shaft arranged at right angles to said axles and provided with bevel-gears which engage said first-named bevel-gears, and provided also with a spur-gear, a clutch, a spring to open said clutch, a wheel sliding on said shaft, but not turning therewith, and having an externally-threaded hub, an internally-threaded hub which engages said externally-threaded hub, and a spur-gear secured to the driven counterpart of said clutch and engaging said first-named spur-gear, as and for the purpose specified.

9. The combination of the car provided with wheels and axles, bevel-gears secured to said axles, a shaft arranged at right angles to said axles and provided with bevel-gears which engage said first-named bevel-gears, and provided also with a spur-gear, a clutch, a spring to open said clutch, a wheel sliding on said shaft, but not turning therewith, and having an externally-threaded hub, a gear having an internally-threaded hub which engages said externally-threaded hub, a counter-shaft, a pinion fast on said counter-shaft and engaging said last-named gear, a bevel-gear fast on said counter-shaft, a vertical spindle, a bevel-gear fast thereon and engaging the bevel-gear on said counter-shaft and a hand-wheel secured on said spindle, and a spur-gear secured to the driven counterpart of said clutch and engaging said first-named spur-gear, as and for the purpose specified.

In witness whereof I have signed this specification, in the presence of two subscribing witnesses, this 25th day of June, A. D. 1887.

WILLIAM F. SHERMAN.

Witnesses:
ALBERT M. MOORE,
KIRKLEY HYDE.